United States Patent [19]
Sakuma et al.

[11] Patent Number: 5,747,912
[45] Date of Patent: May 5, 1998

[54] SWITCHED RELUCTANCE MOTOR

[75] Inventors: Masafumi Sakuma, Chiryu; Akemi Ookawa, Chita-gun; Takahiro Myouga, Kariya, all of Japan

[73] Assignee: Aisin Seiki Kabushiki Kaisha, Kariya, Japan

[21] Appl. No.: 564,584

[22] Filed: Nov. 29, 1995

[30] Foreign Application Priority Data

Nov. 29, 1994 [JP] Japan ..................... 6-295428

[51] Int. Cl.$^6$ ..................... H02K 19/10; H02K 1/22
[52] U.S. Cl. ..................... 310/261; 310/51; 310/168; 310/264
[58] Field of Search ..................... 310/138, 168, 310/254, 261, 264, 269, 51; 318/138

[56] References Cited

U.S. PATENT DOCUMENTS

| | | | |
|---|---|---|---|
| 2,338,525 | 12/1944 | Mason | 310/156 |
| 2,449,506 | 9/1948 | Pollard | 310/156 |
| 3,956,678 | 5/1976 | Byrne et al. | 318/138 |
| 4,496,887 | 1/1985 | Ichihara et al. | 310/156 |
| 4,499,407 | 2/1985 | MacLeod | 310/156 |
| 4,583,015 | 4/1986 | Toshimitsu | 310/254 |
| 4,698,537 | 10/1987 | Byrne et al. | 310/168 |
| 5,250,867 | 10/1993 | Gizaw | 310/156 |
| 5,428,257 | 6/1995 | Lurkens | 310/168 |

FOREIGN PATENT DOCUMENTS

| | | | |
|---|---|---|---|
| 4877314 | 1/1973 | Japan . | |
| 61-203847 | 1/1986 | Japan . | |
| 86/06891 | 11/1986 | WIPO | 310/168 |
| 95/22192 | 8/1995 | WIPO | 310/156 |

Primary Examiner—Steven L. Stephan
Assistant Examiner—B. Mullins
Attorney, Agent, or Firm—Sughrue, Mion, Zinn, Macpeak & Seas, PLLC

[57] ABSTRACT

A switched reluctance motor has a rotor disposed in an annular stator and formed mainly of a stack of iron plates. The rotor has pole protrusions that face the stator. The pole protrusions have weak magnetic portions provided therein. Each weak magnetic portion has a shape elongated from a leading outer point to a tailing inner point, or a shape that has a base side extending a leading outer point to a tailing inner point and that extends from the base side in the rotational direction and in the inward radial direction. The weak magnetic portions are formed of a material that has a weaker magnetism than the materials forming the other portions of the rotor.

6 Claims, 6 Drawing Sheets

SHAPE OF POLE PROTRUSION

SWITCHED RELUCTANCE MOTOR

BACKGROUND OF THE INVENTION

1. Field of the Invention

The present invention relates to a switched reluctance motor that is operated in a predetermined rotational direction, for use as, for example, the drive source of an electric motor vehicle.

2. Description of the Related Art

A typical switched reluctance motor (hereinafter, referred to as "SR motor") comprises a ring-shape stator that has a plurality of pole portions defined by wire coils and disposed in a circular arrangement, a rotor disposed rotatably in an inner space defined by the stator and having pole protrusions that face the pole portions of the stator. Normally, the rotor is an iron core formed by stacking iron plates. When supplied with electricity, the wire coils become magnetized together with the pole portions to attract the pole protrusions of the rotor. The rotor is continuously rotated by selectively distributing electric current to the coils.

This type of SR motors are disclosed in, for example, Japanese unexamined patent application publication Nos. SHO 48-77314 and SHO 61-203847, and U.S. Pat. No. 3,956,678.

SR motors generate torque by utilizing magnetic attractive force that acts between the rotor and the stator when the coils are magnetized. However, conventional SR motors normally suffer vibration problems. The magnetic attractive force acting between the stator and the rotor in generally circumferential directions quickly increases as the rotor rotates during a cycle of the electric current distribution (to the presently selected coils), and then abruptly terminates at the time of switching the current distribution (to other coils). This on-off cycle of magnetic attractive force causes the rotor and the stator to considerably vibrate in generally circumferential directions.

In an SR motor disclosed in U.S. Pat. No. 3,956,678, a plurality of slot zones are provided in a leading end portion of each pole protrusion of the rotor (the leading end portion refers to an end portion facing in a predetermined direction of rotor rotation) to reduce the magnetic force immediately before the switching of current distribution. However, this art also reduces the overall torque of the SR motor.

SUMMARY OF THE INVENTION

Accordingly, it is an object of the present invention to provide a simple-structured motor that reduces the magnetic attractive force immediately before the switching of current distribution while still achieving a desirable torque.

According to the present invention, there is provided a switched reluctance motor comprising: an annular stator having a plurality of pole portions that are circularly arranged and defined by wire coils; and a rotor rotatably disposed in an inside space of the annular stator and having at least one pole protrusion that faces the pole portions of the stator. Said at least one pole protrusion has a weak magnetic portion that is formed by a material having a weaker magnetism than a material forming other portions of the rotor. The weak magnetic portion has a shape extending generally from a leading outer point to a tailing inner point. Alternatively, the weak magnetic portion may have a shape that has a base side extending generally from a leading outer point to a tailing inner point and that extends, from the base side, generally in the rotational direction and generally in the inward radial direction.

It is preferred that the weak magnetic portion be formed by a groove or hole formed in said at least one pole protrusion.

It is also preferred that the weak magnetic portion be formed by a groove (slot) or hole formed in said at least one pole protrusion and a nonmagnetic high electric-resistant member provided in the groove (slot) or hole.

It is further preferred that the rotor comprise a stack of plates and that the nonmagnetic high electric-resistant member extend through said plurality of plates.

Furthermore, the weak magnetic portion is preferably provided near a leading end of said at least one pole protrusion.

When the coils are selectively supplied with electricity, magnetic attractive force is generated between at least one of the pole protrusions of the rotor and at least one of the pole portions of the stator to rotate the rotor. By switching the current distribution to the coils, the rotor continues to rotate.

In a period before a leading edge portion of the pole protrusion of the rotor substantially aligns with a tailing edge portion of the pole portion of the stator, magnetic force lines concentrate in the leading and tailing edge portions of the rotor and stator. Therefore, torque and magnetic attractive force are generated in this period substantially independently from whether a magnetic weak portion is provided. In a subsequent period when the leading edge portion of the pole protrusion faces the tailing edge portion of the pole portion, the magnetic attractive force is reduced compared with the conventional art because the magnetic weak portion blocks magnetic force lines in the pole protrusion. On the other hand, since torque mainly acts between a leading edge portion of the pole protrusion of the rotor and a tailing or leading edge portion of the pole portion of the stator, the torque is only temporarily reduced when the leading end of the weak magnetic portion of the pole protrusion faces the tailing edge portion of the pole portion, and immediately regains as the weak magnetic portion passes by and moves away from the tailing edge portion of the pole portion of the stator.

Thus, the switched reluctance motor of the invention reduces the magnetic attractive force between the stator pole portions and the rotor pole protrusions in the radial direction at the time of switching the current distribution to the coils, compared with the conventional art. The invention also avoids a large amount of torque reduction.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENT

A preferred embodiment of the present invention will be described with reference to the accompanying drawings.

Figure 1:
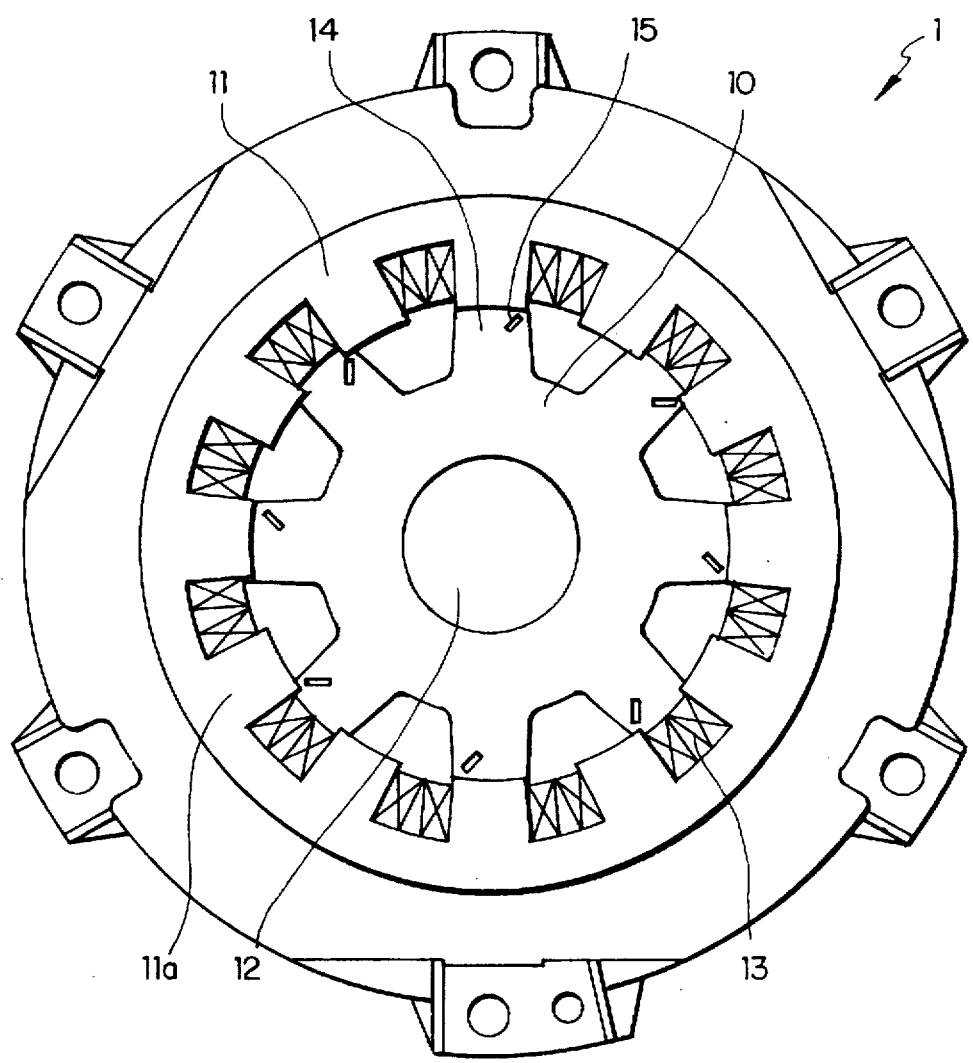
FIG. 1 schematically illustrates the construction of an embodiment of the SR motor of the present invention.

Referring to FIG. 1, an SR motor 1 comprises an annular stator 11 and a rotor 10. The stator 11 has a plurality (twelve in FIG. 1) of pole portions 11a defined by coils 13, which are arranged along the inner circumferential surface of the stator 11. The rotor 10 is disposed in a space enclosed by the stator 11 and is rotatably supported by a rotor shaft 12. The rotor 10 has pole protrusions 14 (eight pole protrusions in FIG. 1) that face the pole portions 11a of the stator 11. The rotor 10 is essentially composed of a stack of iron plates. Each pole protrusion 14 of the rotor 10 has a weak magnetic portion 15 formed by a material (including air) that has a weaker magnetism than the material or materials forming other portions of the rotor 10. The weak magnetic portions 15 are provided near the leading ends of the pole protrusions 14, she leading ends facing in a predetermined direction of rotor rotation. In FIG. 1, the rotor 10 is rotated clockwise as indicated by the arrow.

Figure 2:
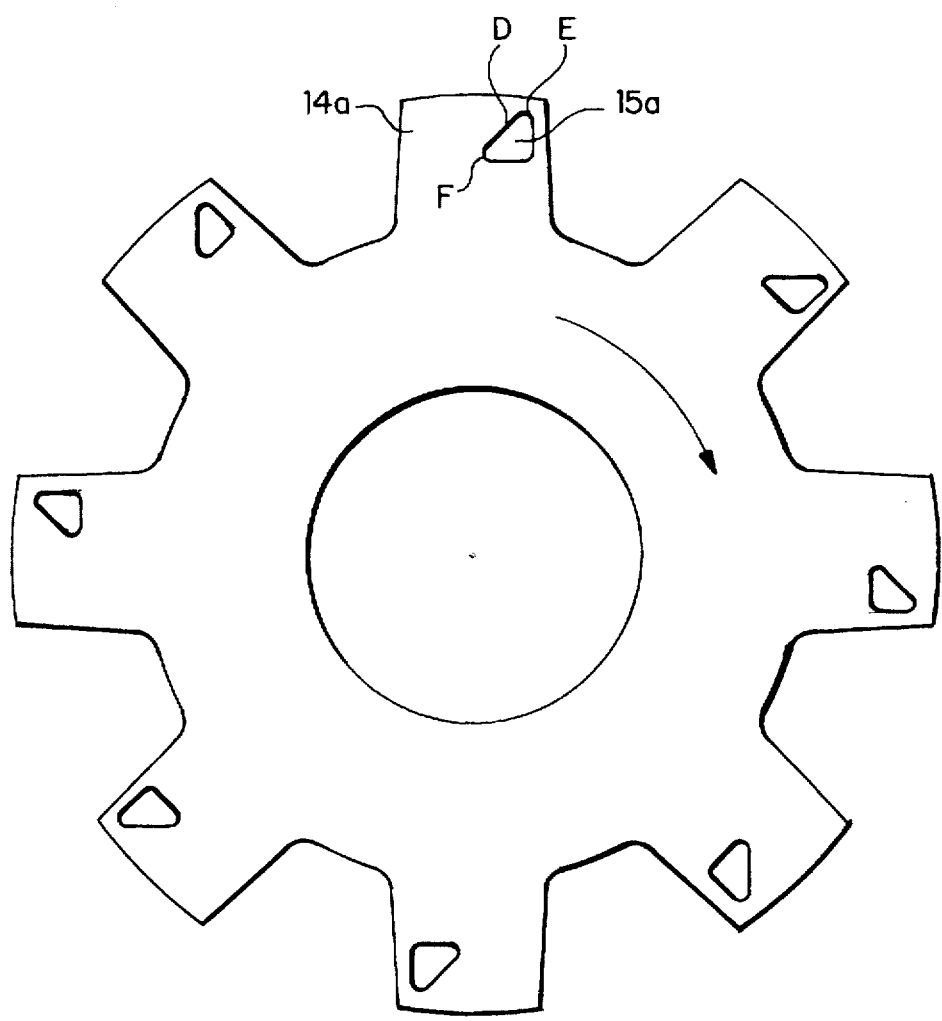
FIG. 2 is a front elevation of a preferred example of the rotor as shown in FIG. 1.

A preferred example of the rotor 10 is illustrated in FIG. 2. Each pole protrusion 14a has a generally triangular hole 15a in which the base side D extends obliquely with respect to the rotational (circumferential) direction, that is, along an imaginary line from a leading outer point to a tailing inner point, and another side extends generally from the tailing inner point in the rotational direction, and the other side extends generally from the leading outer point in an inward radial direction. The corners of each triangular hole 15a may be rounded as shown in FIG. 2. As long as the base side D of each hole 15a extends obliquely from a leading cuter point to a tailing inner point and each hole 15a extends from its base sides D generally in an inward radial direction and in a rotational direction, the holes 15a may have shapes other than triangular shapes. Furthermore, although it is preferred that the base side D of each hole 15a be generally straight, the base side D may be curved.

When the coils 13 of the stator 11 are supplied with electric current (that is, energized), magnetic attractive force is generated between the pole portions 11a of the stator 11 and the pole protrusions 14 of the rotor 10 to rotate the rotor 10. By switching (or shifting) current distribution to the coils 13, the rotor 10 continues to rotate.

Figure 3:
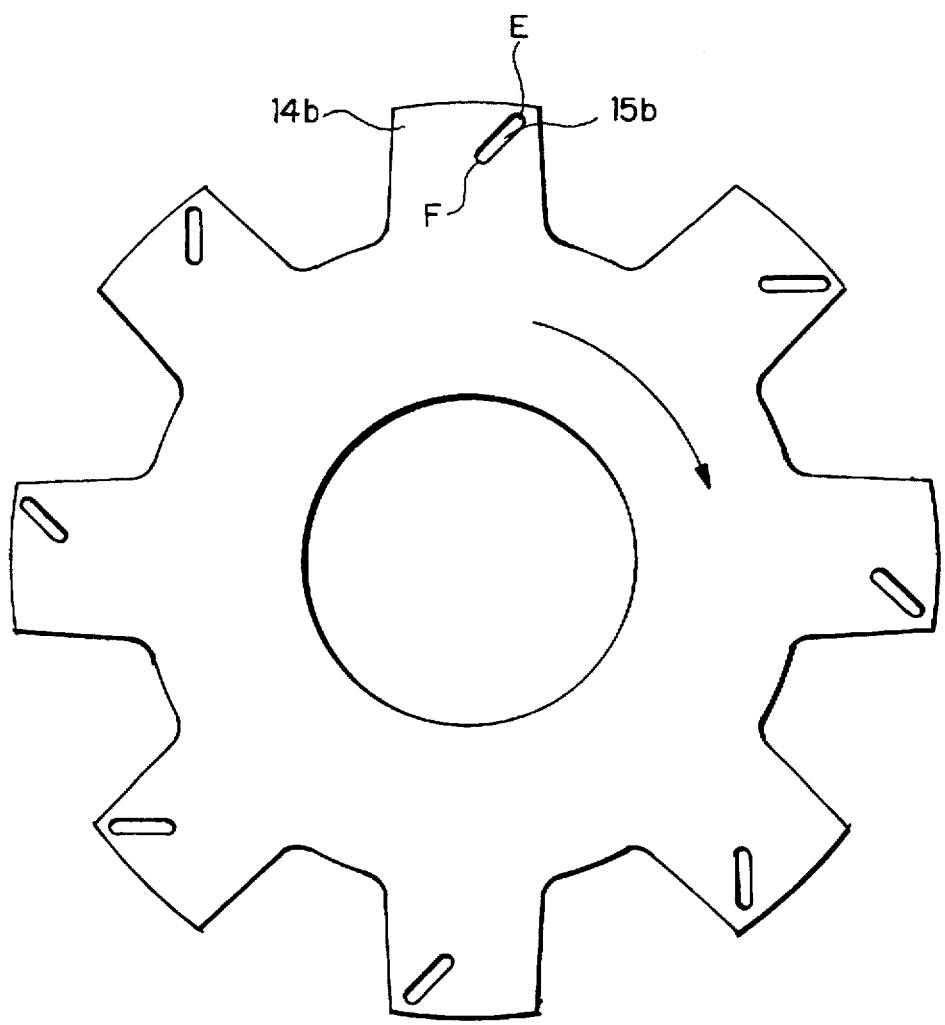
FIG. 3 is another preferred example of the rotor as shown in FIG. 1.
Figure 4A:
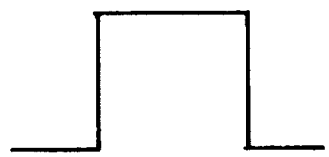
FIG. 4 schematically compares the shapes of pole protrusions according to a conventional art example, a comparative example, and preferred examples according to the embodiment of the invention.
Figure 4B:
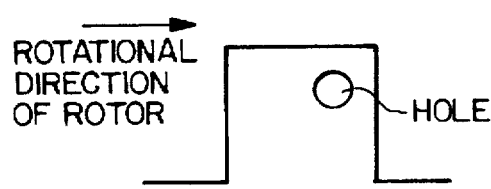
Figure 4C:
Figure 4D:
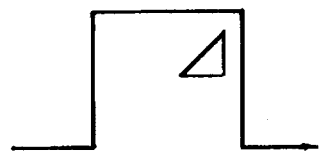

Another example of the rotor 10 is illustrated in FIG. 3. Each pole protrusion 14b has a rounded-end elongated groove (or slot) 15b extending obliquely to the rotational direction from a leading outer point E to a tailing inner point F. The grooves 15b may also have elliptic shapes.

It is defined herein that the terms "hole" and "groove" used in this application include a bore and a slot extending through the rotor.

The holes 15a or the grooves 15b reduce magnetism to serve as the weak magnetic portions 15 that have weaker magnetism than the other portions of the pole protrusion 10.

Nonmagnetic high electric-resistant members may be disposed in the holes 15a or the grooves 15b.

Preferred examples according to the embodiment will be compared with a conventional art example and a comparative example.

FIG. 4 illustrates a conventional art example (a) in which the pole protrusions have no weak magnetic portion, a comparative example (b) in which the pole protrusions have circular holes, a preferred example (c) according to the embodiment in which the pole protrusions have elliptical holes, and another preferred example (d) according to the embodiment in which the pole protrusions have triangular holes.

Figure 5:
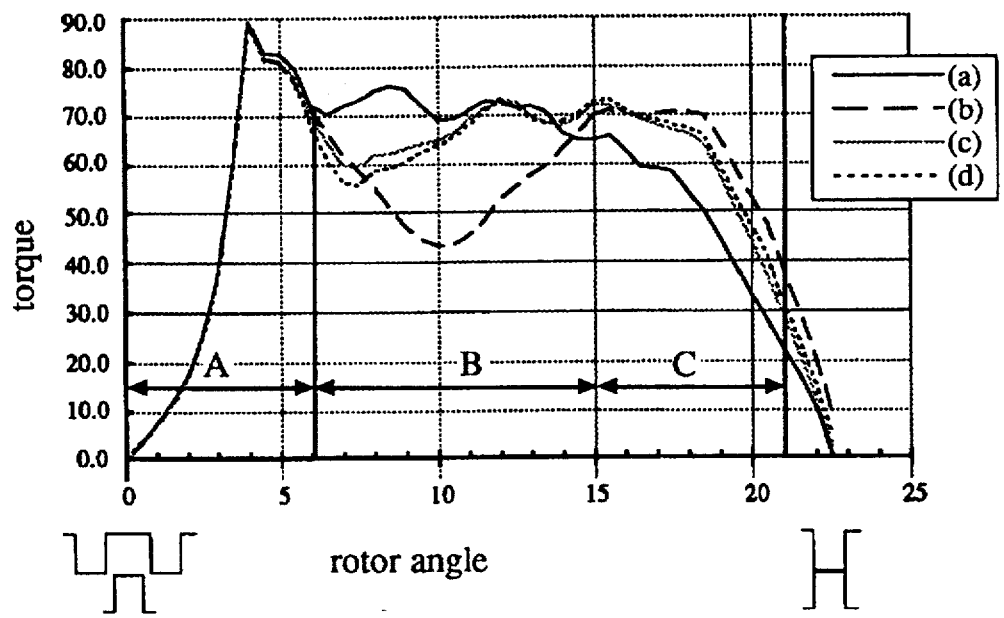
FIG. 5 is a graph indicating the relation between the rotor angle and the torque regarding the conventional art example, the comparative example, and the preferred examples according to the embodiment as illustrated in FIG. 4.

FIG. 5 indicates the relation between the rotor angle and the torque with respect to the conventional art example (a), the comparative example (b) and the preferred examples (c) and (d).

Figure 6:
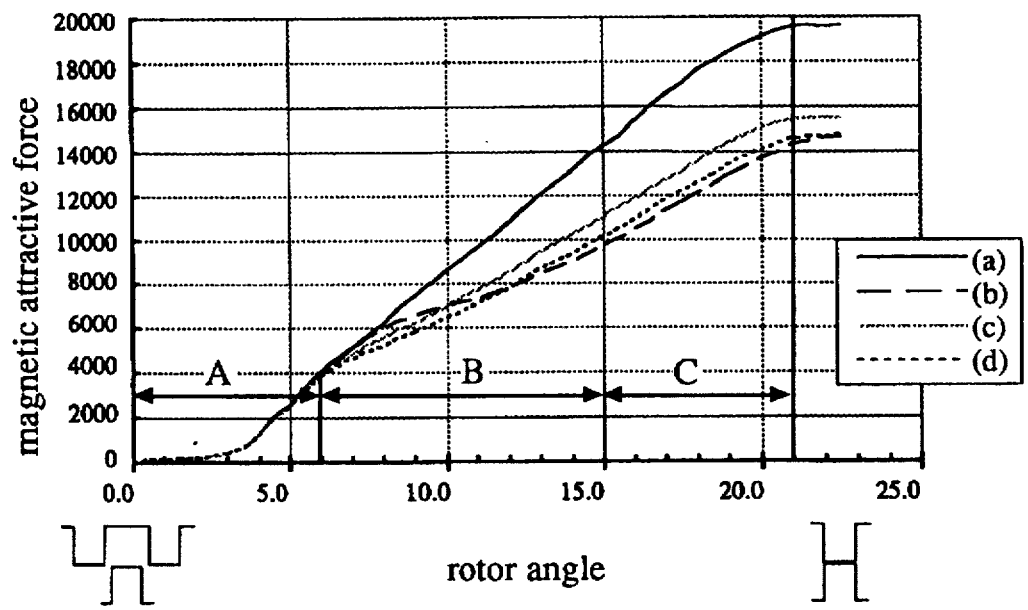
FIG. 6 is a graph indicating the relation between the rotor angle and the magnetic attractive force regarding the conventional art example, the comparative example, and the preferred examples according to the embodiment as illustrated in FIG. 4.

FIG. 6 indicates the relation between the rotor angle and the magnetic attractive force with respect to these examples (a), (b), (c) and (d). The rotor angle is measured from the origin (0°) where a pole protrusion 14 is substantially centered between two neighboring pole portions 11a of the stator 11. Thus, the rotor angle becomes 22.5° when the pole protrusion 14 exactly faces the forward one of the two neighboring pole portions 11a.

In a period A from the origin until a leading edge portion of the pole protrusion 14 aligns with a tailing edge portion of the forward pole portion 11a, the magnetic force lines concentrate in these edge portions of the pole protrusion 14 and the forward pole portion 11a. Therefore, the torque and the magnetic attractive force are produced substantially independently of whether a weak magnetic portion is provided. As indicated in FIG. 5, the torque increases as the pole protrusion 14 comes closer to the forward pole portion 11a, and then starts to decrease when the leading edge of the pole protrusion 14 substantially aligns with the tailing edge of the pole portion 11a, with respect to all the examples (a), (b), (c) and (d). The magnetic attractive force between the pole protrusion 14 and the forward pole portion 11a starts to gradually increase when the above-described edge alignment is achieved, with respect to all the examples (a), (b), (c) and (d).

In a period B from alignment of the leading edge portion of the pole protrusion 14 and the tailing edge portion of the forward pole portion 11a until the tailing edge portion of the pole portion 11a faces the weak magnetic portion of the pole protrusion 14, the comparative example (b) and the preferred examples (c), (d) produce less magnetic attractive forces than the conventional art example (a) because the weak magnetic portions black magnetic force lines inside the pole protrusions 14. Since the force for rotating the rotor 10 mainly acts between leading edge portions of the pole protrusions 14 of the rotor 10 and tailing or leading edge portions of the pole portions 11a of the stator 11, the torques outputted by the comparative example (b) and the preferred examples (c), (d) temporarily decrease at the time of substantial alignment of a leading portion of the weak magnetic portion of the pole protrusion 14 with the tailing portion of the pole portion 11a, whereas the torque outputted by the conventional art example (a) remains relatively constant. The torque outputted by the comparative example (c) considerably falls because its circular hole makes a larger weak magnetic portion that faces the tailing edge portion of the pole portion 11a. On the other hand, the preferred examples (c), (d) soon regain torque as the rotors 10 continue to rotate. This is because the holes of the preferred examples (c), (d)

are formed so that the distance between the tailing edge portion of the pole portion 11a of the stator 11 and a portion of the weak magnetic portion that exactly faces the tailing edge portion of the pole portion ha becomes greater as the rotors 10 rotate.

In a period C after the weak magnetic portion has passed the tailing edge of the pole portion 11a of the stator 11, the torque decreases with respect to all the examples. In this period, the comparative example (b) and the preferred examples (c), (d) output greater torques than the conventional art example (a). It is speculated that the reason for this torque enhancement is that the presence of the weak magnetic portions in the leading outer edge portions of the pole protrusions 14a increases the magnetic force flux density in the tailing inner edge portions of the pole portion 11a. The comparative example (b) and the preferred examples (c) (d) produce less magnetic attractive forces than the conventional art example (a) at the point of switching (or shifting) current distribution to the coils 13, that is, about 21° (the end of the period C) according to this embodiment. This leads to reduction of vibrations.

In short, although the weak magnetic portion causes a temporary torque reduction for a short period (or small rotor angle range), the torque reduction is compensated for by the subsequent torque enhancement, thus resulting in favorable and sufficient torque output over the effective rotor angle range. Particularly, the preferred examples (c) and (d) output substantially constant levels of torque over the rotor angle ranges B and C with only small amounts of torque reduction in the rotor angle range B, exhibiting torque characteristics comparable to those of the conventional art example (a).

Figure 7:
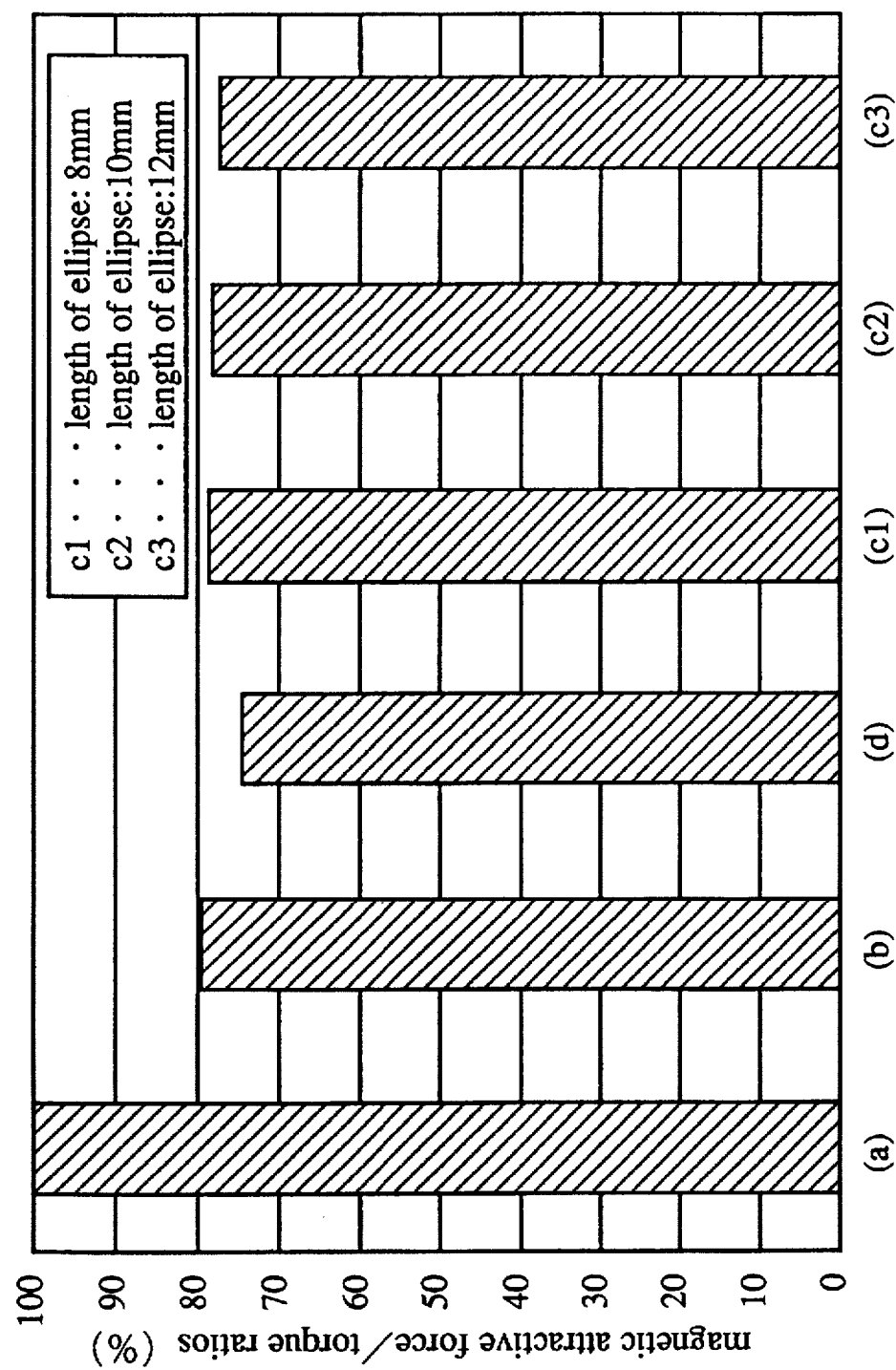
FIG. 7 is a diagram indicating the magnetic attractive force/torque ratios of the magnetic attractive force regarding the conventional art example, the comparative example, and preferred examples of the embodiment as illustrated in FIG. 4.

The diagram of FIG. 7 indicates the ratio of magnetic attractive force to torque with regard to various examples. The magnetic attractive force/torque ratios are expressed relative to the ratio regarding the conventional art example (a) defined as 100%. In FIG. 7, numerals (c1), (c2) and (c3) indicate preferred examples having elliptic holes of 8 mm, 10 mm and 12 mm in length, respectively. As seen from the diagram, the preferred example (d) (triangular Hole) exhibits the best performance, followed by the preferred examples (c1), (c2) and (3), which exhibit substantially equal levels of performance.

To summarize, the pole protrusions 14 of the rotor 10 are provided with weak magnetic portions 15 each of which has an elongated shape extending from a leading outer point to a tailing inner point or a shape that has a base side extending from a leading outer point to a tailing inner point and that extends from the base side generally in a rotational direction and generally in an inward radial direction, the weak magnetic portion 15 being formed of a material that has a weaker magnetism than the material or materials forming the other portions of the rotors 14. The weak magnetic portions 15 provide stable torque output over the effective rotor angle ranges and production of relatively reduced magnetic attractive force between the stator pole portions and the rotor pole protrusions in the radial at the time of switching (shifting) current distribution to the coils 13. Thus, required torque characteristics can be achieved without having to employ larger coils, and vibrations during the motor operation can be reduced.

If the weak magnetic portions are formed in a shape (for example, a triangular hole) that has a base side extending from a leading outer point to a tailing inner point and that extends from the base side generally in the rotational direction and generally in an inward radial direction, the magnetic attractive force can be significantly reduced compared with the conventional art, while achieving substantially the same level of total torque output as that achieved by the conventional art.

The weak magnetic portions 15 according to the above embodiment are provided in the form of holes 15b or groves 15a. This formation can be easily performed without significantly increasing production costs.

Alternatively, the holes 15b or the grooves 15a of the pole protrusions 14 may be filled or provided with nonmagnetic high electric-resistant members. This will increase the connection rigidity of the rotor 10 formed of a stack of iron plates, and correct rotational imbalance of the rotor 10, and reduce the effect of eddy current that occurs in the rotor 10. Thus, provision of the nonmagnetic High electric-resistant members in the weak magnetic portions will bring about more stable performances.

As understood from the above description, the weak magnetic portions provided near the leading edge of the pole protrusions of the rotor will further improve the motor performances.

While the present invention has been described with reference to what is presently considered to be a preferred embodiment thereof, it is to be understood that the invention is not limited to the disclosed embodiment or examples. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A switched reluctance motor comprising:

an annular stator having a plurality of pole portions that are circularly arranged and defined by wire coils; and a rotor rotatably disposed in an inside space of the annular stator and having a plurality of pole protrusions;

wherein current is alternately supplied to the wire coils of the pole portions of the stator, the pole portions being opposed to said pole protrusions of the rotor during rotation of the rotor, and each of said pole protrusions of the rotor having a weak magnetic portion formed by a groove whose outer circumference is entirely contained within a leading edge portion of each of said pole protrusions, said weak magnetic portion having a shape extending generally from a leading outer point to a tailing inner point and that is formed by a material having a weaker magnetism than a material forming other portions of the rotor, whereby each weak magnetic portion provides a stable torque output while reducing a magnetic attractive force between each of said stator pole portions and each of said rotor pole protrusions in a radial direction.

2. A switched reluctance motor according to claim 1, wherein a nonmagnetic high electric-resistant member is provided in the groove.

3. A switched reluctance motor according to claim 2 wherein the rotor comprises a stack of plurality of plates, and wherein the nonmagnetic high electric-resistant member extends through said plurality of plates.

4. A switched reluctance motor comprising:

an annular stator having a plurality of pole portions that are circularly arranged and defined by wire coils; and a rotor rotatably disposed in an inside space of the annular stator and having a plurality of pole protrusions;

wherein current is alternately supplied to the wire coils of the pole portions of the stator, the pole portions being opposed to said pole protrusions of the rotor during rotation of the rotor, and each of said pole protrusions of the rotor having a weak magnetic portion formed by a hole whose outer circumference is entirely contained within a leading edge portion of each of said pole protrusions, said weak magnetic portion being formed in a shape that has a base side extending generally from a leading outer point to a tailing inner point and that extends, from the base side, generally in the rotational direction and generally in the inward radial direction, the weak magnetic portion being formed of a material having a weaker magnetism than a material forming other portions of the rotor, whereby each weak magnetic portion provides a stable torque output while reducing a magnetic attractive force between each of said stator pole portions and each of said rotor pole protrusions in the radial direction.

5. A switched reluctance motor according to claim 4, wherein a nonmagnetic high electric-resistant member is provided in the hole.

6. A switched reluctance motor according to claim 5, wherein the rotor comprises a stack of plurality of plates, and wherein the nonmagnetic high electric-resistant member extends through said plurality of plates.

* * * * *